United States Patent
Zhang et al.

(10) Patent No.: US 12,548,997 B2
(45) Date of Patent: *Feb. 10, 2026

(54) PHOTOVOLTAIC POWER GENERATION SYSTEM, PHOTOVOLTAIC INVERTER, AND DIRECT CURRENT COMBINER BOX

(71) Applicant: Huawei Digital Power Technologies Co., Ltd., Shenzhen (CN)

(72) Inventors: Xiufeng Zhang, Dongguan (CN); Yanzhong Zhang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 19 days.

This patent is subject to a terminal disclaimer.

(21) Appl. No.: 18/650,464

(22) Filed: Apr. 30, 2024

(65) Prior Publication Data

US 2024/0283241 A1 Aug. 22, 2024

Related U.S. Application Data

(63) Continuation of application No. 17/875,823, filed on Jul. 28, 2022, now Pat. No. 12,003,096, which is a
(Continued)

(51) Int. Cl.
*H02H 7/26* (2006.01)
*H02J 3/38* (2006.01)
*H02S 40/34* (2014.01)

(52) U.S. Cl.
CPC .......... *H02H 7/268* (2013.01); *H02J 3/381* (2013.01); *H02S 40/34* (2014.12); *H02J 2300/26* (2020.01)

(58) Field of Classification Search
CPC .................................................. H02H 7/268
(Continued)

(56) References Cited

U.S. PATENT DOCUMENTS

2011/0090607 A1 4/2011 Luebke et al.
2011/0301772 A1 12/2011 Zuercher et al.
(Continued)

FOREIGN PATENT DOCUMENTS

CN 1848577 A 10/2006
CN 102055178 A 5/2011
(Continued)

OTHER PUBLICATIONS

Xu, "Analysis of the application of solar photovoltaic power grid-connected technology", CNKI:SUN:DTSJ.0.2018-10-046, Low Carbon World, Oct. 2018 (English abstract included), 4 pages.
(Continued)

*Primary Examiner* — Joseph Chang
(74) *Attorney, Agent, or Firm* — Maier & Maier, PLLC

(57) ABSTRACT

A photovoltaic power generation system includes a protection switch and a plurality of DC-DC converters. Each DC-DC converter includes a direct current bus, a DC-DC circuit, and at least one input interface. The input interface is configured to connect to a photovoltaic unit. The photovoltaic unit includes at least one photovoltaic module. The input interface is connected to the direct current bus by using the protection switch, the direct current bus is connected to an input end of the DC-DC circuit, and an output end of the DC-DC circuit is an output end of the DC-DC converter. The protection switch includes a release device and a switching device that are connected in series. The release device is configured to: when a short-circuit fault occurs on a line in which the release device is located, control the switching device to be disconnected.

20 Claims, 13 Drawing Sheets

Related U.S. Application Data continuation of application No. PCT/CN2020/142425, filed on Dec. 31, 2020.

(58) Field of Classification Search
USPC .............................................................. 307/82
See application file for complete search history.

(56) References Cited

U.S. PATENT DOCUMENTS

| | | | |
|---|---|---|---|
| 2012/0126626 | A1 | 5/2012 | Falk et al. |
| 2014/0002933 | A1 | 1/2014 | Gao et al. |
| 2014/0055900 | A1 | 2/2014 | Luebke et al. |
| 2014/0361621 | A1* | 12/2014 | Lindtjorn .................. H02J 1/06 307/38 |
| 2015/0333503 | A1 | 11/2015 | Bermingham et al. |
| 2017/0047727 | A1 | 2/2017 | Cao et al. |
| 2021/0036520 | A1 | 2/2021 | Yu et al. |
| 2022/0297552 | A1* | 9/2022 | Zhang ..................... B60L 53/11 |

FOREIGN PATENT DOCUMENTS

| | | | |
|---|---|---|---|
| CN | 102354955 | A | 2/2012 |
| CN | 102761294 | A | 10/2012 |
| CN | 103140765 | A | 6/2013 |
| CN | 103151757 | A | 6/2013 |
| CN | 103299503 | A | 9/2013 |
| CN | 203645297 | U | 6/2014 |
| CN | 103986124 | A | 8/2014 |
| CN | 104158154 | A | 11/2014 |
| CN | 204045601 | U | 12/2014 |
| CN | 104409294 | A | 3/2015 |
| CN | 104465253 | A | 3/2015 |
| CN | 204578458 | U | 8/2015 |
| CN | 104934927 | A | 9/2015 |
| CN | 204652311 | U | 9/2015 |
| CN | 105356840 | A | 2/2016 |
| CN | 205304269 | U | 6/2016 |
| CN | 206117592 | U | 4/2017 |
| CN | 206149209 | U | 5/2017 |
| CN | 107004526 | A | 8/2017 |
| CN | 107210168 | A | 9/2017 |
| CN | 104919671 | B | 12/2017 |
| CN | 109510450 | A | 3/2019 |
| CN | 109802426 | A | 5/2019 |
| CN | 110224381 | A | 9/2019 |
| CN | 110571847 | A | 12/2019 |
| CN | 110729714 | A | 1/2020 |
| CN | 111262429 | A | 6/2020 |
| CN | 211127119 | U | 7/2020 |
| CN | 111697626 | A | 9/2020 |
| CN | 111740392 | A | 10/2020 |
| CN | 113508506 | B | 9/2022 |
| EP | 2960945 | A2 | 12/2015 |
| EP | 2369709 | B1 | 5/2016 |
| JP | 2011019312 | A | 1/2011 |
| JP | 2012244852 | A | 12/2012 |
| JP | 2015523847 | A | 8/2015 |
| JP | 2015531859 | A | 11/2015 |
| JP | 2016208635 | A | 12/2016 |

OTHER PUBLICATIONS

"Trip unit", Electrical Equipment, Industrial Encyclopedia, https://baike.baidu.com/link?url=b9bhqwV4GnC_D92hqZWcPmsvD15x2lqRPXEc0-ZIpVoDNUWPFcl1EGBLDGZ9R-O3VfcmH8GzAWH64VEBjL3GQaBSPwzVgO25U_3r2eZdp0KNeCyYj7sPqiyPKN3XovZQ, Printed Mar. 28, 2023, 7 pages.

Chen et al., "Series Arc Fault Identification for Photovoltaic System Based on Time-Domain and Time-Frequency-Domain Analysis", IEEE Journal of Photovoltaics, vol. 7, No. 4, Jul. 2017, 10 pages.

Huawei, "SUN2000 (8KTL-28KTL) User Manual", Huawei Technologies Co., Ltd., Dec. 12, 2013, Issue 4, 261 pages.

Huawei, "SUN2000-(33KTL, 36KTL, 40KTL)-US User Manual", Huawei Technologies Co., Ltd., Jun. 20, 2019, Issue 7, 234 pages.

* cited by examiner

PHOTOVOLTAIC POWER GENERATION SYSTEM, PHOTOVOLTAIC INVERTER, AND DIRECT CURRENT COMBINER BOX

CROSS-REFERENCE TO RELATED APPLICATIONS

This application is a continuation of U.S. patent application Ser. No. 17/875,823, filed on Jul. 28, 2022, which is a continuation of International Application No. PCT/CN2020/142425, filed on Dec. 31, 2020. All of the afore-mentioned patent applications are hereby incorporated by reference in their entireties.

TECHNICAL FIELD

The embodiments relate to the field of photovoltaic power generation technologies, a photovoltaic power generation system, a photovoltaic inverter, and a direct current combiner box.

BACKGROUND

Photovoltaic power generation is a technology that uses a photovoltaic effect of a semiconductor interface to convert light energy into electric energy. A photovoltaic power generation system may usually include a photovoltaic unit, an inverter, an alternating current power distribution device, and the like. To obtain a relatively high output voltage or output current, the photovoltaic unit usually formed by connecting a plurality of photovoltaic modules in a serial and/or parallel connection manner. To improve power generation efficiency of the photovoltaic power generation system, the photovoltaic unit is connected to a component that has an independent maximum power point tracking (MPPT) function.

Currently, to improve a direct current ratio of the photovoltaic power generation system (a ratio of power of the photovoltaic unit to input power of the photovoltaic inverter), each MPPT component is usually connected to at least two photovoltaic units. In an example in which a photovoltaic unit or a line in which a photovoltaic unit is located is short circuited, a short-circuit current is a sum of output currents of other connected photovoltaic units. When there is only one another connected photovoltaic unit, the photovoltaic unit and the line can tolerate this short-circuit current because the short-circuit current is relatively small. However, when there are two or more another connected photovoltaic units, the short-circuit current is relatively large. To protect the photovoltaic unit and the line, a fuse may be connected in series to a positive output end or a negative output end of the photovoltaic unit, so that the fuse blows to protect the photovoltaic unit and the line.

However, a fusing current of the fuse is usually relatively high, and an output current of each photovoltaic unit is relatively low. Therefore, a sum of short-circuit currents of the plurality of photovoltaic units may be difficult to reach the fusing current of the fuse. As a result, a time consumed for blowing of the fuse is long, and the fuse cannot effectively protect the photovoltaic unit and the line.

SUMMARY

The embodiments may provide a photovoltaic power generation system, a photovoltaic inverter, and a direct current combiner box, to effectively protect a photovoltaic unit and a line when a short circuit occurs on the photovoltaic unit or the line.

According to a first aspect, the embodiments may provide a photovoltaic power generation system. The photovoltaic power generation system includes a protection switch and a plurality of direct current (DC)-direct current converters. Each DC-DC converter includes a direct current bus, a DC-DC circuit, and at least one input interface. The input interface is configured to connect to a photovoltaic unit, and the photovoltaic unit includes at least one photovoltaic module. The input interface is connected to the direct current bus by using the protection switch, the direct current bus is connected to an input end of the DC-DC circuit, and an output end of the DC-DC circuit is an output end of the DC-DC converter. The protection switch includes a release device and a switching device that are connected in series. The release device is configured to: when a short-circuit fault occurs on a line in which the release device is located, control the switching device to be disconnected.

According to the photovoltaic power generation system, when a short-circuit fault occurs on the photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for the built-in fuse may be disposed on a photovoltaic unit side instead of being disposed below a photovoltaic inverter or a direct current combiner box of the photovoltaic power generation system, so that cable costs are further reduced.

In a possible implementation, the release device is an electromagnetic release device. When a reverse current on the line in which the release device is located is greater than a first current value, the release device controls the switching device to be disconnected. The first current value is related to an electrical parameter of the electromagnetic release device.

In a possible implementation, the release device is an electromagnetic release device. When an overcurrent occurs on the line in which the release device is located, the release device controls the switching device to be disconnected.

In a possible implementation, the release device is a thermal release device. When an overcurrent occurs on the line in which the release device is located, the release device controls the switching device to be disconnected. For example, for a bimetallic sheet thermal release device, when an overcurrent occurs on a line in which the release device is located, a bimetallic sheet generates heat to drive the switching device to act.

In a possible implementation, each input interface is connected to one photovoltaic unit.

In a possible implementation, a maximum of two photovoltaic units are connected in parallel, and then connected to the input interface. In this case, each photovoltaic unit can tolerate a current input by one or two other photovoltaic units.

In a possible implementation, a maximum of three photovoltaic units are connected in parallel, and then connected to the input interface. In this case, each photovoltaic unit can tolerate currents input by a maximum of two other photovoltaic units.

In a possible implementation, the photovoltaic power generation system further includes a direct current-alternating current (AC) circuit, and a DC-AC converter and the plurality of DC-DC converters form an inverter. Positive output ports of the plurality of DC-DC converters are connected in parallel to a positive input port of the DC-AC converter, negative output ports of the plurality of DC-DC converters are connected in parallel to a negative input port of the DC-AC converter, and an output port of the DC-AC converter is an output port of the inverter.

In a possible implementation, the plurality of DC-DC converters form a direct current combiner box, the positive output ports of the plurality of DC-DC converters are connected in parallel to form a positive output port of the direct current combiner box, and the negative output ports of the plurality of DC-DC converters are connected in parallel to form a negative output port of the direct current combiner box.

In a possible implementation, the photovoltaic power generation system further includes a protective device. The protective device is connected in series or in parallel to the photovoltaic unit. The release device is further configured to: when controlling the switching device to be disconnected, prevent the protective device from triggering a protection action.

In other words, when the current photovoltaic power generation system that uses the protective device is reconstructed, the protective device may not need to be removed, so as to facilitate reconstruction.

In a possible implementation, the protective device includes at least one of a fuse, an optimizer, or a disconnection box.

According to a second aspect, the embodiments may further provide a photovoltaic inverter, configured to connect to a photovoltaic unit. The photovoltaic unit includes at least one photovoltaic module, and the photovoltaic inverter includes a protection switch, a DC-AC converter, and a plurality of DC-DC converters. Each DC-DC converter includes a direct current bus, a DC-DC circuit, and at least one input interface. The input interface is configured to connect to the photovoltaic unit, and the photovoltaic unit includes at least one photovoltaic module. The input interface is connected to the direct current bus by using the protection switch, the direct current bus is connected to an input end of the DC-DC circuit, and an output end of the DC-DC circuit is an output end of the DC-DC converter. Positive ports of the output ends of the plurality of DC-DC converters are connected in parallel to a positive input port of the DC-AC converter, and negative ports of the output ends of the plurality of DC-DC converters are connected in parallel to a negative input port of the DC-AC converter. The protection switch includes a release device and a switching device that are connected in series. The release device is configured to: when a short-circuit fault occurs on a line in which the release device is located, control the switching device to be disconnected.

According to the photovoltaic inverter, when a short-circuit fault occurs on the connected photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for a built-in fuse may be disposed on a photovoltaic unit side instead of being disposed below the photovoltaic inverter of the photovoltaic power generation system. Therefore, cable costs are further reduced.

With reference to the second aspect, in a possible implementation, the release device is an electromagnetic release device. When a reverse current on the line in which the release device is located is greater than a first current value, the release device controls the switching device to be disconnected.

With reference to the second aspect, in a possible implementation, the release device is an electromagnetic release device. When an overcurrent occurs on the line in which the release device is located, the release device controls the switching device to be disconnected.

With reference to the second aspect, in a possible implementation, the release device is a thermal release device. When an overcurrent occurs on the line in which the release device is located, the release device controls the switching device to be disconnected.

According to a third aspect, the embodiments may further provide a direct current combiner box, configured to connect to a photovoltaic unit. The photovoltaic unit includes at least one photovoltaic module, and the direct current combiner box includes a protection switch and a plurality of DC-DC converters. Each DC-DC converter includes a direct current bus, a DC-DC circuit, and at least one input interface. The input interface is configured to connect to the photovoltaic unit, and the photovoltaic unit includes at least one photovoltaic module. The input interface is connected to the direct current bus by using the protection switch, the direct current bus is connected to an input end of the DC-DC circuit, and an output end of the DC-DC circuit is an output end of the DC-DC converter. Positive ports of the output ends of the plurality of DC-DC converters are connected in parallel to a positive output port of the direct current combiner box, and negative ports of the output ends of the plurality of DC-DC converters are connected in parallel to a negative output port of the direct current combiner box. The protection switch includes a release device and a switching device that are connected in series. The release device is configured to: when a short-circuit fault occurs on a line in which the release device is located, control the switching device to be disconnected.

According to the direct current combiner box, when a short-circuit fault occurs on the connected photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for a built-in fuse may be disposed on a photovoltaic unit side instead of being disposed below the direct current combiner box of the photovoltaic power generation system. Therefore, cable costs are further reduced.

With reference to the third aspect, in a possible implementation, the release device is an electromagnetic release device. When a reverse current on the line in which the release device is located is greater than a first current value, the release device controls the switching device to be disconnected.

With reference to the third aspect, in a possible implementation, the release device is an electromagnetic release device. When an overcurrent occurs on the line in which the release device is located, the release device controls the switching device to be disconnected.

With reference to the third aspect, in a possible implementation, the release device is a thermal release device. When an overcurrent occurs on the line in which the release device is located, the release device controls the switching device to be disconnected.

DETAILED DESCRIPTION OF THE EMBODIMENTS

To improve a direct current ratio of a photovoltaic power generation system, each MPPT component can be connected to at least two photovoltaic units or more photovoltaic units. In addition, to protect a photovoltaic unit and a line when the photovoltaic unit or the line is short circuited, a positive output end or a negative output end of the photovoltaic unit is connected in series to a fuse (or referred to as a fuse blowing). The following describes an example in which each MPPT component is connected to three branches. A principle when each MPPT component is connected to more branches is similar. Details are not described herein again.

Figure 1:
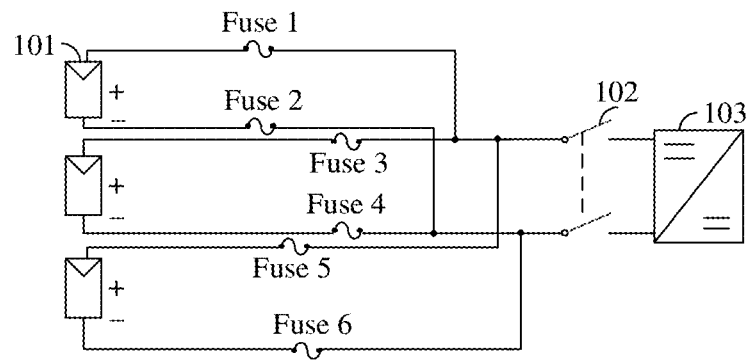
FIG. 1 is a schematic diagram 1 of a short-circuit protection circuit used in a conventional technology.
Figure 2:
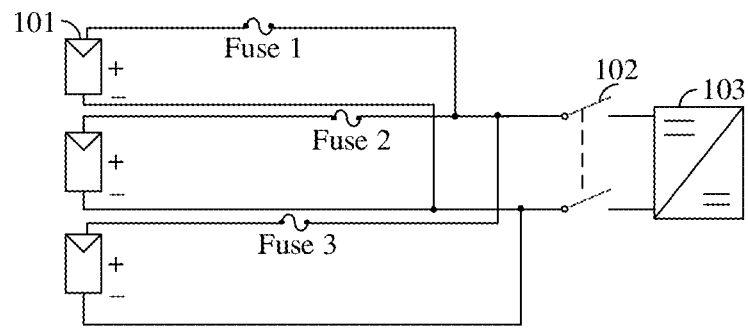
FIG. 2 is a schematic diagram 2 of a short-circuit protection circuit used in a conventional technology.
Figure 3:
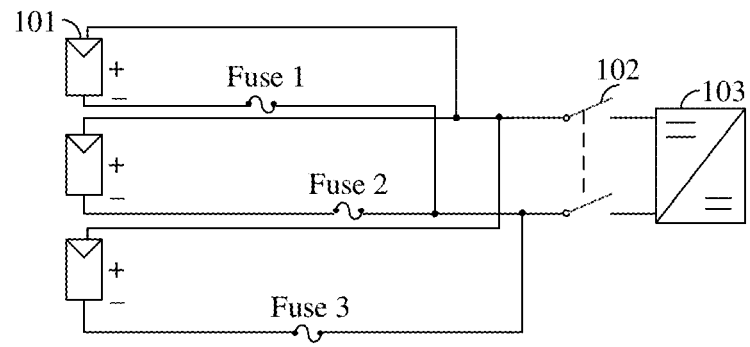
FIG. 3 is a schematic diagram 3 of a short-circuit protection circuit used in a conventional technology

Refer to all of FIG. 1 to FIG. 3. FIG. 1 is a schematic diagram in which both a positive output end and a negative output end of a photovoltaic unit are connected in series to fuses. FIG. 2 is a schematic diagram in which a positive output end of a photovoltaic unit is connected in series to a fuse. FIG. 3 is a schematic diagram in which a negative output end of a photovoltaic unit is connected in series to a fuse.

Each branch includes one photovoltaic module 101. Three branches are connected in parallel before a switch 102 and then are connected to an MPPT component 103 by using the direct current switch 102. A fuse 1 to a fuse 6 in FIG. 1, a fuse 1 to a fuse 3 in FIG. 2, and a fuse 1 to a fuse 3 in FIG. 3 are fuses that blow when a current in a line is excessively large to protect the photovoltaic module and the line.

However, because an actual output current of the photovoltaic unit is relatively small, the fuse cannot blow fast. A fuse whose rated current is 15 A is used as an example. According to a fuse standard, when the fuse does not blow, an allowed current may reach up to 1.13×15=16.95 A, and a current required for the fuse to blow within one hour is 1.35×15=20.25 A. A short-circuit current is difficult to meet the current required for fast blowing of the fuse. Therefore, the fuse may not blow or needs a relatively long time to blow. As a result, a photovoltaic unit and a line cannot be effectively protected. In some embodiments, because cable protection needs to be considered, a Y wire harness of a built-in fuse further needs to be disposed on a DC-DC converter side, and a photovoltaic unit of a DC-DC converter may be connected by using a relatively long cable. This further increases cable costs.

To resolve the foregoing problem, the embodiments may provide a photovoltaic power generation system, a photovoltaic inverter, and a direct current combiner box, to effectively protect a photovoltaic unit and a line when a short circuit occurs on the photovoltaic unit or the line. Details are described below with reference to the accompanying drawings.

The following terms "first", "second", and the like are merely intended for a purpose of description and shall not be understood as an indication or implication of relative importance or implicit indication of a quantity of indicated features. Therefore, a feature limited by "first", "second", or the like may explicitly or implicitly include one or more features.

To make a person skilled in the art understand the solutions better, the following clearly describes the embodiments with reference to the accompanying drawings.

A single photovoltaic unit in the following embodiments may include one photovoltaic module or may be formed by connecting a plurality of photovoltaic modules in series and/or in parallel. For example, a plurality of photovoltaic modules is first connected in series to form a photovoltaic string, and then a plurality of photovoltaic strings is connected in parallel to form a photovoltaic unit. A quantity of photovoltaic modules included in the photovoltaic unit is not limited in this embodiment and may be set by a person skilled in the art based on an actual requirement. In addition, an electrical parameter of a single photovoltaic module is not limited in this embodiment.

Output voltages of a plurality of photovoltaic units connected to a same DC-DC converter may be the same or different. This is not limited in this embodiment.

The DC-DC converter of the photovoltaic power generation system provided in this embodiment can be connected to at least two photovoltaic units by using an interface. After being connected by using the interface, the photovoltaic units may be connected in parallel inside the DC-DC converter to a direct current bus, so that output currents of the photovoltaic units are aggregated into the direct current bus, thereby forming a branch. The following first describes an existing form of the branch.

Figure 4:
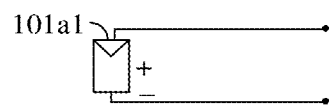
FIG. 4 is a schematic diagram of a branch according to an embodiment.

FIG. 4 is a schematic diagram of a branch according to an embodiment.

The branch includes a photovoltaic unit 101a1, a positive output end of the photovoltaic unit 101a1 is a positive output end of the branch, and a negative output end of the photovoltaic unit 101a1 is a negative output end of the branch. This is not described in description of the following embodiments.

Figure 5:
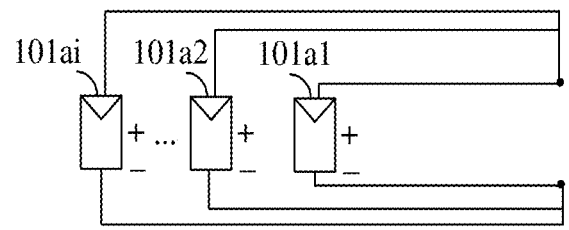
FIG. 5 is a schematic diagram of another branch according to an embodiment.

FIG. 5 is a schematic diagram of another branch according to an embodiment.

The branch may include a plurality of branches shown in FIG. 4. Therefore, at least two photovoltaic units are included, for example, 101a1, 101a2, . . . , and 101ai in sequence.

The branch in this embodiment is a concept in the electricity field and refers to a line through which a branch current to be aggregated into a direct current bus flows. Still using FIG. 5 as an example, a line in which the photovoltaic unit 101a1 is located may be referred to as a branch, and a line formed by connecting the photovoltaic unit 101a1 and the photovoltaic unit 101a2 in parallel may also be referred to as a branch. Positive output ends of all photovoltaic units are aggregated to form a positive output end of the branch, and negative output ends of all the photovoltaic units are aggregated to form a negative output end of the branch.

The "branch" in the following embodiments refers to a general term of all branches shown in FIG. 4 and FIG. 5, in other words, a general term of all branches except a trunk (the direct current bus).

The following provides description by using an example in which a photovoltaic power generation system includes one DC-DC converter. When the photovoltaic power generation system includes a plurality of DC-DC converters, a principle is similar, and details are not described.

Figure 6:
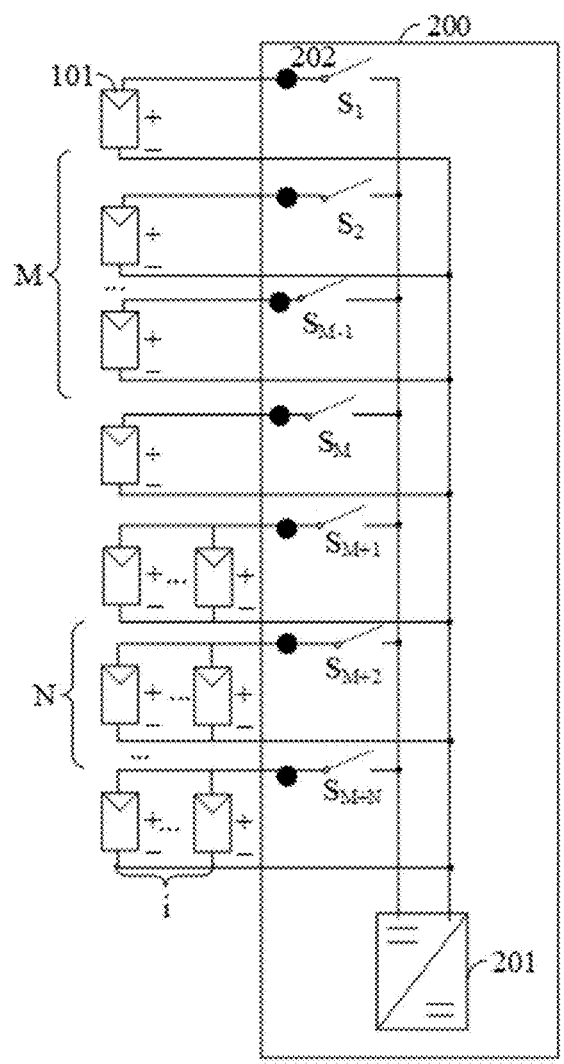
FIG. 6 is a schematic diagram of a photovoltaic power generation system according to an embodiment.

FIG. 6 is a schematic diagram of a photovoltaic power generation system according to an embodiment.

The photovoltaic power generation system includes photovoltaic units 101, protection switches $S_1$ to $S_{M+N}$, and a DC-DC converter 200.

The DC-DC converter 200 includes an interface, a direct current bus, and a DC-DC circuit 201.

The DC-DC converter 200 may be connected to the photovoltaic units by using the interface. A quantity of photovoltaic units that are connected to a same interface is not limited.

When one interface is connected to a plurality of photovoltaic units, the plurality of photovoltaic units is connected in parallel to form the branch shown in FIG. 5 and then connected to the interface.

Each photovoltaic unit includes at least one photovoltaic module.

Each protection switch includes a release device and a switching device that are connected in series. The release device is configured to: when a short-circuit fault occurs on a line in which the release device is located, control the switching device to be disconnected. In other words, in this case, the protection switch is disconnected, and an input interface 202 of a line in which the protection switch is located is disconnected from the direct current bus, to cut off the line with the short-circuit fault.

Using FIG. 6 as an example, when a short-circuit fault occurs on a single photovoltaic unit and the faulty photovoltaic unit can tolerate an output current of one another normal photovoltaic unit, a value of i in the figure is 2.

For another example, when a short-circuit fault occurs on a single photovoltaic unit and the faulty photovoltaic unit can tolerate output currents of two other normal photovoltaic units, the value of i in the figure is 3.

A value of i is determined based on an actual current tolerance value of the photovoltaic unit. This is not limited in this embodiment. It should be noted that, the illustration in FIG. 6 is merely for ease of drawing and description. The i photovoltaic units in the figure may be connected in parallel inside the DC-DC converter 200 or may be first externally connected in parallel to an interface for connecting the direct current bus.

When there is no short-circuit fault, currents of all branches are aggregated into the direct current bus. Therefore, an absolute value of a current of the direct current bus is greater than an absolute value of a current of any branch. A current direction is flowing from a positive electrode of a photovoltaic unit to a positive direct current bus.

When a short-circuit fault occurs on any branch, output currents of all other normal branches flow to the branch with the short-circuit fault, and a reverse current occurs on the branch with the short-circuit fault. When a value of M+N is greater than 2, an overcurrent further occurs on the branch with the short-circuit fault.

The release device is mechanically connected to the switching device and is configured to release a holding mechanism when a protection action is triggered, so that the switching device is automatically disconnected. A principle of the release device is as follows: When a reverse current or an overcurrent occurs on a branch in which the release device is located, the release device controls the switching device to be disconnected, so as to protect the photovoltaic unit and the line.

The DC-DC circuit 201 may be a boost circuit, a buck circuit, or a buck-boost circuit.

In conclusion, according to the photovoltaic power generation system, when a short-circuit fault occurs on a photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for the built-in fuse may be disposed on a photovoltaic unit side instead of being disposed below a photovoltaic inverter or a direct current combiner box of the photovoltaic power generation system, so that cable costs are further reduced.

The release device may be implemented in different manners. For example: In some embodiments, the release device is an electromagnetic release device. When a reverse current on the branch in which the release device is located is greater than a first current value, the release device controls the switching device to be disconnected. In some other embodiments, the release device is an electromagnetic release device. When an overcurrent occurs on the branch in which the release device is located, the release device controls the switching device to be disconnected. In still some other embodiments, the release device is a thermal release device. When an overcurrent occurs on the branch in which the release device is located, the release device controls the switching device to be disconnected.

The following describes an implementation of the photovoltaic power generation system.

The following first provides description by using an example in which a DC-DC converter is connected to two photovoltaic units.

Figure 7:
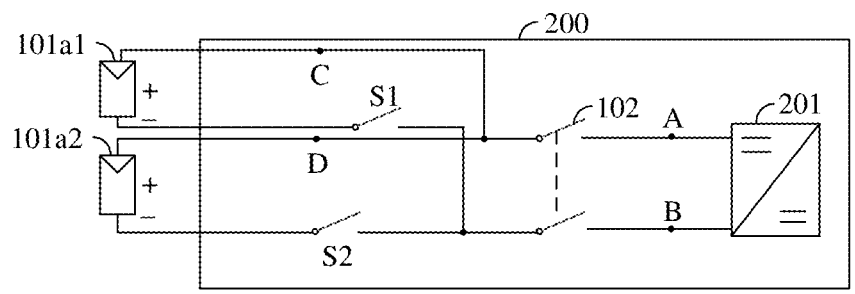
FIG. 7 is a schematic diagram of another photovoltaic power generation system according to an embodiment.

FIG. 7 is a schematic diagram of another photovoltaic power generation system according to an embodiment.

Each DC-DC converter 200 is connected to two photovoltaic units 101a1 and 101a2 by using an interface.

The two photovoltaic units are connected to the interface of the DC-DC converter 200. After being connected in parallel inside the DC-DC converter 200, the two photovoltaic units are connected to a DC-DC circuit 201 by using a direct current switch 102. The direct current switch 102 is configured to protect the circuit. In some embodiments, a direct connection may be performed instead of disposing the direct current switch 102.

Each photovoltaic unit is further connected in series to a protection switch S1.

When there is no short-circuit fault, currents of the two photovoltaic units are aggregated into a direct current bus. An absolute value of a current of the direct current bus (an absolute value of a detection current of a point A or a point B) is greater than an absolute value of a current of any branch (an absolute value of a detection current of a point C or a point D).

When a short-circuit fault occurs on one photovoltaic unit, an output current of the other normal photovoltaic unit flows to the short-circuited photovoltaic unit. As a result, a reverse current occurs on a branch in which the photovoltaic unit with the short-circuit fault is located.

In this case, a release device may be an electromagnetic release device. When a reverse current on a branch in which the release device is located is greater than a first current value, the release device controls a switching device to be disconnected.

When a short-circuit fault occurs on a branch in which the photovoltaic unit 101a1 is located, a protection switch S1 is disconnected to disconnect the branch in which the photovoltaic unit 101a1 is located, thereby protecting the photovoltaic unit and the line. When a short-circuit fault occurs on a branch in which the photovoltaic unit 101a2 is located, a protection switch S2 is disconnected to disconnect the branch in which the photovoltaic unit 101a2 is located, thereby protecting the photovoltaic unit and the line.

In some embodiments, a protection switch may be connected in series to a positive output end of a photovoltaic unit or may be connected in series to a negative output end of the photovoltaic unit. Alternatively, one protection switch may be connected in series to each of a positive output end and a negative output end of a photovoltaic unit to implement redundancy control. This is not limited in this embodiment.

In some other embodiments, when one DC-DC circuit is connected to only two photovoltaic units, either of the protection switches S1 and S2 may be canceled. For example, after S1 is canceled, when the photovoltaic unit 101a1 has a short circuit, the photovoltaic unit 101a2 transmits a current to the branch in which the photovoltaic unit 101a1 is located, but the current is within a tolerance range of the photovoltaic unit 101a1. Therefore, the photovoltaic unit 101a1 is not damaged. When the photovoltaic unit 101a2 has a short circuit, the protection switch S2 is disconnected to protect the circuit.

In conclusion, when the switching device of the photovoltaic power generation system is disconnected, the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for the built-in fuse may be disposed on a photovoltaic unit side instead of being disposed below a photovoltaic inverter or a direct current combiner box of the photovoltaic power generation system, so that cable costs are further reduced.

The foregoing embodiment is described by using an example in which each DC-DC converter is connected to photovoltaic units by using two input interfaces. However, currently, to improve a direct current ratio of the photovoltaic power generation system, three, four, and even more input interfaces may be disposed in each DC-DC converter to connect photovoltaic units. The following first describes a working principle for a case that three input interfaces are disposed in each DC-DC converter.

Figure 8:
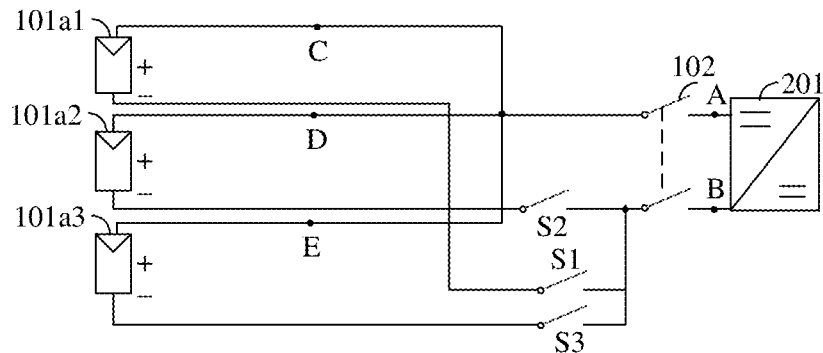
FIG. 8 is a schematic diagram of still another photovoltaic power generation system according to an embodiment.

FIG. 8 is a schematic diagram of still another photovoltaic power generation system according to an embodiment.

Three photovoltaic units are respectively connected to the three input interfaces of the DC-DC converter. After the three photovoltaic units each is connected in series to one protection switch inside the DC-DC converter, the three photovoltaic units are connected in parallel and then connected to a DC-DC circuit 201 by using a direct current switch 102. The direct current switch 102 is configured to protect the circuit. In actual application, a direct connection may be performed instead of disposing the direct current switch 102.

A photovoltaic unit 101a1 is connected in series to a protection switch S1, a photovoltaic unit 101a2 is connected in series to a protection switch S2, and a photovoltaic unit 101a3 is connected in series to a protection switch S3.

When there is no short-circuit fault, output currents of the three photovoltaic units are aggregated into a direct current bus. Therefore, an absolute value of a current of the direct current bus (an absolute value of a detection current of a point A or a point B) is greater than an absolute value of a current of any branch (an absolute value of a detection current of a point C, a point D, or a point E). In this case, a current direction of the point C, the point D, and the point E may be set as a preset current direction, for example, set as a positive direction.

When a short-circuit fault occurs on one photovoltaic unit, it is assumed that the short-circuit fault occurs on a line in which the photovoltaic unit 101a3 is located and a single photovoltaic unit can tolerate a reverse current transmitted from only one another branch.

In this case, output currents of the other two normal photovoltaic units flow to the photovoltaic unit 101a3 with the short circuit fault. As a result, an overcurrent occurs on a branch in which the photovoltaic unit 101a3 is located and a reverse current occurs (opposite to the current direction of the point E).

In a possible implementation, a release device of S3 is an electromagnetic release device. When the reverse current on the branch in which the photovoltaic unit 101a3 is located is greater than a first current value, the release device controls a switching device to be disconnected.

In another possible implementation, a release device of S2 is an electromagnetic release device. When an overcurrent occurs on the branch in which the photovoltaic unit 101a3 is located, the release device controls a switching device to be disconnected.

In still another possible implementation, the release device is a thermal release device. When an overcurrent occurs on the branch in which the photovoltaic unit 101a3 is located, the release device controls a switching device to be disconnected.

One input interface may alternatively be connected in series to two protection switches and then to the direct current bus inside the DC-DC converter. In this case, the two protection switches may use different types of release devices.

After S3 is disconnected, the photovoltaic unit 101a1 and the photovoltaic unit 101a2 can continue to work normally, thereby protecting the photovoltaic unit and the line.

The foregoing embodiment is described by using an example in which three input interfaces are disposed in each DC-DC converter. The following describes a principle for a case that four input interfaces are correspondingly disposed in each DC-DC converter.

Figure 9:
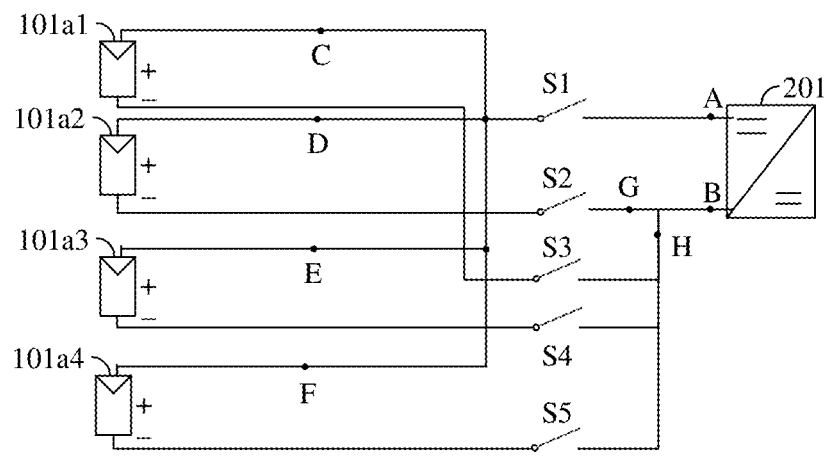
FIG. 9 is a schematic diagram of yet another photovoltaic power generation system according to an embodiment.

FIG. 9 is a schematic diagram of yet another photovoltaic power generation system according to an embodiment.

Each of four photovoltaic units is connected to one input port of the DC-DC converter and then connected in series to a protection switch. Subsequently, the four photovoltaic units are connected in parallel to a DC-DC circuit 201.

Positive output ends of the photovoltaic units are aggregated and then connected to a protection switch S1. A negative output end of a photovoltaic unit 101a1 is connected to a protection switch S3. A negative output end of a photovoltaic unit 101a2 is connected to a protection switch S2. A negative output end of a photovoltaic unit 101a3 is connected to a protection switch S4. A negative output end of a photovoltaic unit 101a4 is connected to a protection switch S5.

In some embodiments, a direct connection may be performed instead of disposing the protection switch S1 in FIG. 9.

When there is no short-circuit fault, currents of the four photovoltaic units are aggregated into the direct current bus, and therefore an absolute value of a current of the direct current bus (an absolute value of a detection current of a detection point A or B) is greater than an absolute value of a current of any branch (absolute values of detection currents of detection points C, D, E, and F).

When a short-circuit fault occurs on one photovoltaic unit, output currents of the other normal photovoltaic units flow to the photovoltaic unit with the short-circuit fault. As a result, an overcurrent and a reverse current occur on a faulty branch.

That a single photovoltaic unit can tolerate a current flowing from only one another branch is still used as an example. In this case, a release device of a protection switch on the faulty branch controls a corresponding switching device to be disconnected, so that the faulty branch is disconnected, and the other photovoltaic units can continue to work normally, thereby protecting the photovoltaic unit and the line.

Figure 10:
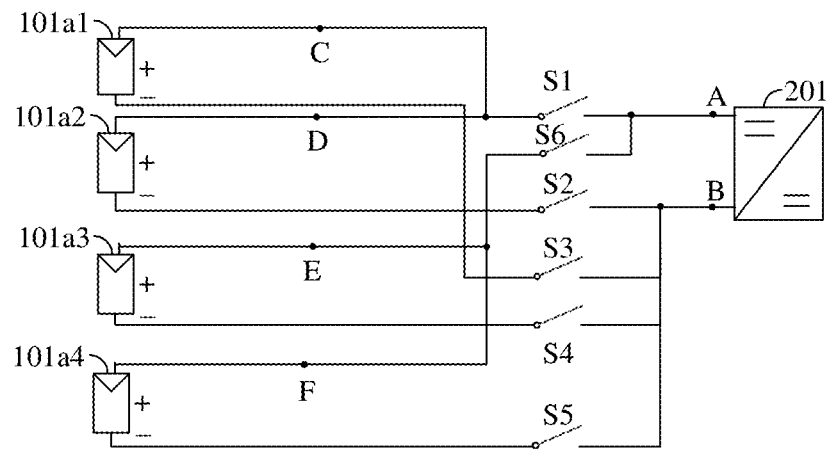
FIG. 10 is a schematic diagram of another photovoltaic power generation system according to an embodiment.

FIG. 10 is a schematic diagram of another photovoltaic power generation system according to an embodiment.

A difference between an implementation shown in FIG. 10 and that in FIG. 9 lies in: A positive output end of a photovoltaic unit 101a1 and a positive output end of a photovoltaic unit 101a2 are aggregated at a protection switch S1 and are connected to a positive direct current bus by using the protection switch S1. A positive output end of a photovoltaic unit 101a3 and a positive output end of a photovoltaic unit 101a4 are aggregated at a protection switch S6 and are connected to the positive direct current bus by using the protection switch S6.

In this case, a principle is similar to that in FIG. 9, and details are not described in this embodiment.

Figure 11:
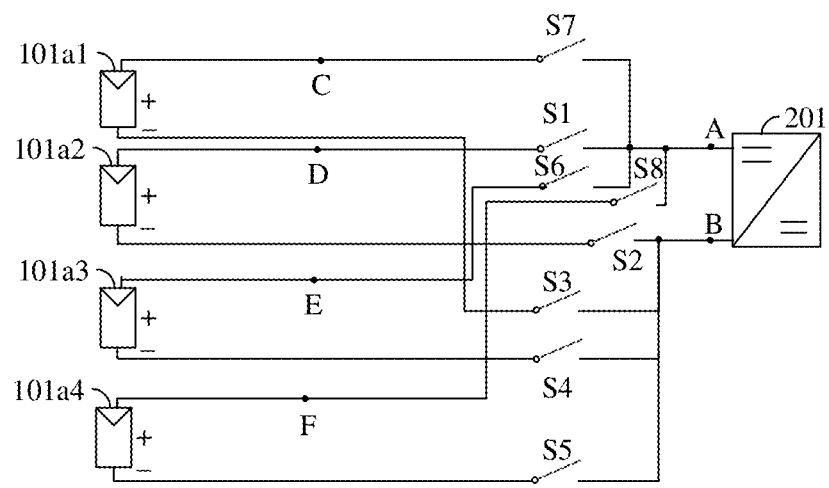
FIG. 11 is a schematic diagram of still another photovoltaic power generation system according to an embodiment.

FIG. 11 is a schematic diagram of still another photovoltaic power generation system according to an embodiment.

A difference between a manner shown in FIG. 11 and that in FIG. 9 lies in: A positive output end of each photovoltaic unit is connected in series to one protection switch inside a DC-DC converter and then aggregated at a positive direct current bus. A negative output end of each photovoltaic unit is connected in series to one protection switch inside the DC-DC converter and then aggregated at a negative direct current bus. Redundantly disposing the protection switch can further improve safety and ensure that a branch in which a photovoltaic unit is located can be disconnected. A principle is similar to that in FIG. 9, and details are not described in this embodiment.

In conclusion, when the DC-DC converter of the photovoltaic power generation system is connected to four photovoltaic units by using interfaces, and a short-circuit fault occurs on a branch, a release device controls a switching device to be disconnected, so that an interface is disconnected from a direct current bus, and a photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for the built-in fuse may be disposed on a photovoltaic unit side instead of being disposed below a photovoltaic inverter or a direct current combiner box of the photovoltaic power generation system, so that cable costs are further reduced.

Figure 12:
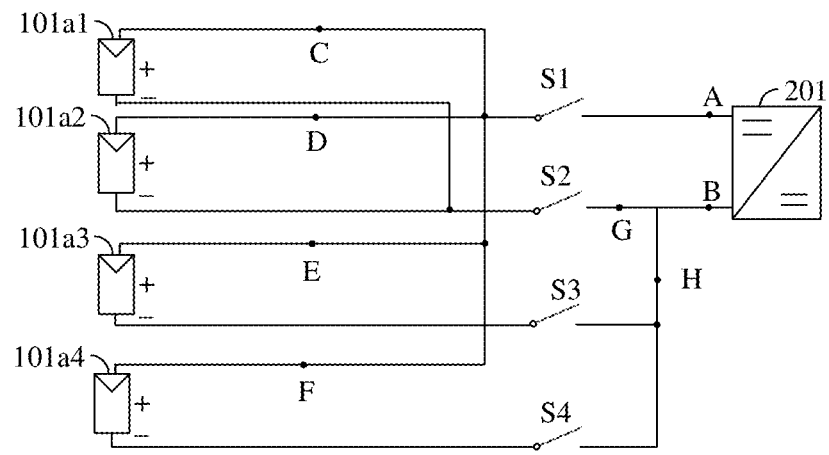
FIG. 12 is a schematic diagram of yet another photovoltaic power generation system according to an embodiment.

FIG. 12 is a schematic diagram of yet another photovoltaic power generation system according to an embodiment.

Photovoltaic units 101a1 and 101a2 are connected in parallel inside a DC-DC converter and then are connected to a direct current bus of the DC-DC converter by using protection switches. Branches in which photovoltaic units 101a3 and 101a4 are respectively located each are connected in series to one protection switch and then are connected to the direct current bus of the DC-DC converter.

Positive output ends of the photovoltaic units 101a1 and 101a2 are connected to a positive direct current bus by using a protection switch S1, and negative output ends of the photovoltaic units 101a1 and 101a2 are connected to a negative direct current bus by using a protection switch S2.

In some embodiments, a direct connection may be performed instead of disposing the protection switch S2.

When there is no short-circuit fault, currents of all branches are aggregated into the direct current bus, and therefore an absolute value of a current of the direct current bus (an absolute value of a detection current of a detection point A or B) is greater than an absolute value of a current of any branch (absolute values of detection currents of detection points C, D, E, F, G, and H).

When a short-circuit fault occurs on a branch, an output current of a normal branch flows to the branch with the short-circuit fault. As a result, a reverse current occurs on the branch with the short-circuit fault.

A release device may be an electromagnetic release device. In this case, a release device of a protection switch on the faulty branch controls a corresponding switching device to be disconnected, so that the branch with the short-circuit fault is disconnected, and another photovoltaic unit can continue to work normally, thereby protecting the photovoltaic unit and the line.

Description with reference to FIG. 12 is as follows:

When a short-circuit fault occurs on a branch in which the photovoltaic unit 101a3 is located, S3 is disconnected. In this case, the photovoltaic unit 101a3 is cut off, and the photovoltaic units 101a1, 101a2, and 101a4 can work normally.

When a short-circuit fault occurs on a branch in which the photovoltaic unit 101a4 is located, S4 is disconnected. In this case, the photovoltaic unit 101a4 is cut off, and the photovoltaic units 101a1, 101a2, and 101a3 can work normally.

When a short-circuit fault occurs on a branch in which the photovoltaic unit 101a1 is located, S1 and S2 are disconnected. In this case, a current input by the photovoltaic unit 101a2 is within a tolerance range of the photovoltaic unit 101a1, and the photovoltaic units 101a3 and 101a4 can work normally.

When a short-circuit fault occurs on a branch in which the photovoltaic unit 101a2 is located, S1 and S2 are disconnected. In this case, a current input by the photovoltaic unit 101a1 is within a tolerance range of the photovoltaic unit 101a2, and the photovoltaic units 101a3 and 101a4 can work normally.

Figure 13:
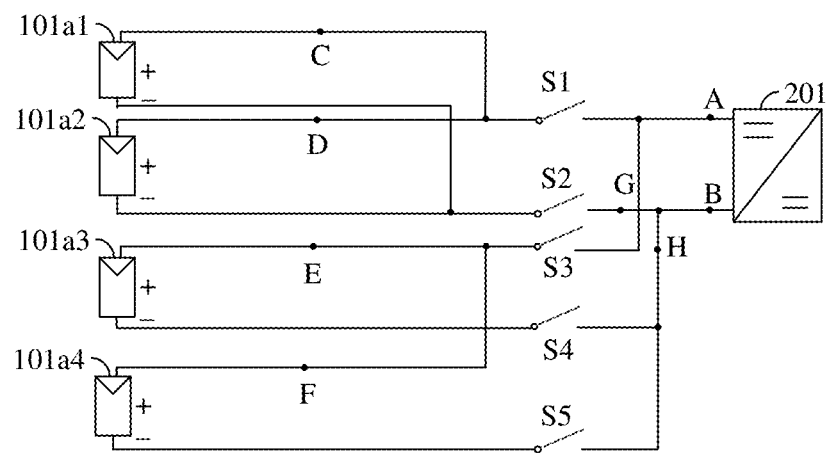
FIG. 13 is a schematic diagram of another photovoltaic power generation system according to an embodiment.

FIG. 13 is a schematic diagram of another photovoltaic power generation system according to an embodiment.

A difference between an implementation shown in FIG. 13 and that in FIG. 12 lies in: Positive output ends of the photovoltaic units 101a3 and 101a4 are aggregated and then are connected to the positive direct current bus by using a protection switch S3, a negative output end of the photovoltaic unit 101a3 is connected to the negative direct current bus by using a protection switch S4, and a negative output end of the photovoltaic unit 101a4 is connected to the negative direct current bus by using a protection switch S5.

A working principle is similar to the description corresponding to FIG. 12, and details are not described in this embodiment.

Figure 14:
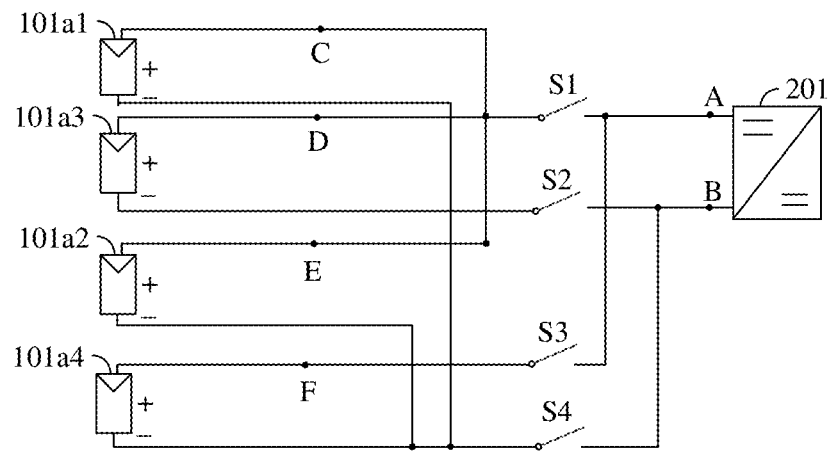
FIG. 14 is a schematic diagram of still another photovoltaic power generation system according to an embodiment.

FIG. 14 is a schematic diagram of still another photovoltaic power generation system according to an embodiment.

A difference between an implementation shown in FIG. 14 and that in FIG. 13 lies in: Photovoltaic units 101a1 and 101a2 are connected in parallel, positive output ends of the photovoltaic units 101a1 and 101a2 are aggregated and then are connected to a positive direct current bus by using a protection switch S1, and negative output ends thereof are aggregated and then are connected to a negative direct current bus by using a protection switch S4. A positive output end of a photovoltaic unit 101a3 is connected to the positive direct current bus by using the protection switch S1, and a negative output end thereof is connected to the negative direct current bus by using a protection switch S2. A positive output end of a photovoltaic unit 101a4 is connected to the positive direct current bus by using a protection switch S3, and a negative output end thereof is connected to the negative direct current bus by using the protection switch S4.

A working principle is similar to the description corresponding to FIG. 12, and details are not described in this embodiment.

Figure 15:
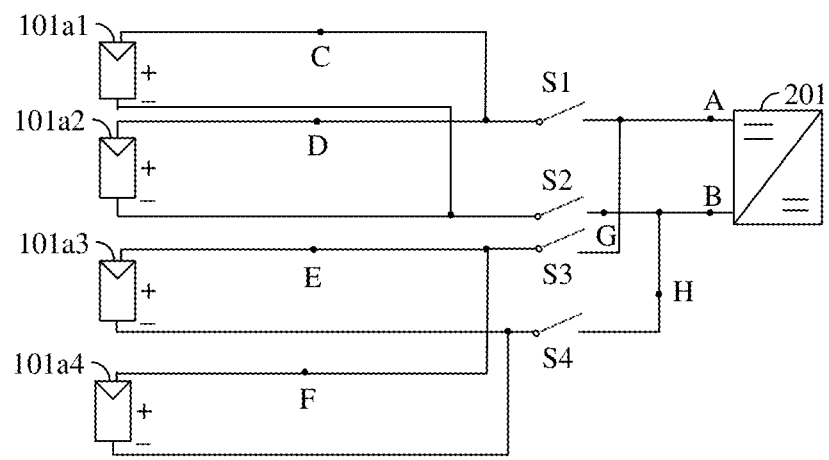
FIG. 15 is a schematic diagram of yet another photovoltaic power generation system according to an embodiment.

FIG. 15 is a schematic diagram of yet another photovoltaic power generation system according to an embodiment.

Photovoltaic units 101a1 and 101a2 are directly connected in parallel inside a DC-DC converter. Positive output ends of the photovoltaic units 101a1 and 101a2 are connected to a positive direct current bus by using a protection switch S1, and negative output ends thereof are connected to a negative direct current bus by using a protection switch S2.

Photovoltaic units 101a3 and 101a4 are directly connected in parallel inside the DC-DC converter. Positive output ends of the photovoltaic units 101a3 and 101a4 are connected to the positive direct current bus by using a protection switch S3, and negative output ends thereof are connected to the negative direct current bus by using a protection switch S4.

When there is no short-circuit fault, currents of all branches are aggregated into the direct current bus, and therefore an absolute value of a current of the direct current bus (an absolute value of a detection current of a detection point A or B) is greater than an absolute value of a current of any branch (absolute values of detection currents of detection points C, D, E, F, G, and H).

When a short-circuit fault occurs on a branch, an output current of a normal branch flows to the branch with the short-circuit fault. As a result, a reverse current occurs on the branch with the short-circuit fault.

A release device may be an electromagnetic release device. In this case, a release device of a protection switch on the faulty branch controls a corresponding switching device to be disconnected, so that the branch with the short-circuit fault is disconnected, and another photovoltaic unit can continue to work normally, thereby protecting the photovoltaic unit and the line.

Description with reference to FIG. 15 is as follows:

When a short-circuit fault occurs on a branch in which the photovoltaic unit 101a1 is located, S1 and S2 are disconnected. In this case, a current input by the photovoltaic unit 101a2 is within a tolerance range of the photovoltaic unit 101a1, and the photovoltaic units 101a3 and 101a4 can work normally.

When a short-circuit fault occurs on a branch in which the photovoltaic unit 101a2 is located, S1 and S2 are disconnected. In this case, a current input by the photovoltaic unit 101a1 is within a tolerance range of the photovoltaic unit 101a2, and the photovoltaic units 101a3 and 101a4 can work normally.

When a short-circuit fault occurs on a branch in which the photovoltaic unit 101a3 is located, S3 and S4 are disconnected. In this case, a current input by the photovoltaic unit 101a4 is within a tolerance range of the photovoltaic unit 101a3, and the photovoltaic units 101a1 and 101a2 can work normally.

When a short-circuit fault occurs on a branch in which the photovoltaic unit 101a4 is located, S3 and S4 are disconnected. In this case, a current input by the photovoltaic unit 101a3 is within a tolerance range of the photovoltaic unit 101a4, and the photovoltaic units 101a1 and 101a2 can work normally.

In some embodiments, a direct connection may be performed instead of disposing at least one of the protection switches S1 and S2, or a direct connection may be performed instead of disposing at least one of the protection switches S3 and S4, or a direct connection may be performed instead of disposing either of the protection switches S1 and S2 and either of the protection switches S3 and S4, to reduce a quantity of protection switches connected in series, thereby reducing costs.

The foregoing embodiments describe the working principles for the cases that each DC-DC converter includes three input interfaces and the cases that each DC-DC converter includes four input interfaces. In some embodiments, each DC-DC converter may further be correspondingly connected to more photovoltaic units. The following describes a working principle for a case that a quantity of photovoltaic units connected to each DC-DC converter is greater than four.

Figure 16:
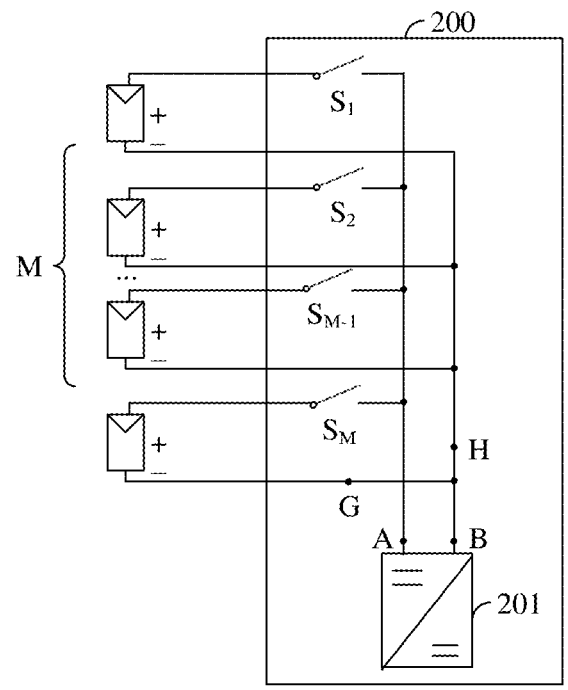
FIG. 16 is a schematic diagram of another photovoltaic power generation system according to an embodiment.

FIG. 16 is a schematic diagram of another photovoltaic power generation system according to an embodiment.

A DC-DC converter is provided with M input interfaces to connect to photovoltaic units, and each interface is connected to one photovoltaic unit to form M first-type photovoltaic unit branches. M is an integer greater than or equal to 3.

When the photovoltaic unit is connected in series to one protection switch, the protection switch is connected in series to a positive output end or a negative output end of the photovoltaic unit. When the photovoltaic unit is connected in series to two protection switches, the protection switches are connected in series to a positive output end and a negative output end of the photovoltaic unit to implement redundancy protection.

The M photovoltaic units are each connected in series to one protection switch, and then are connected in parallel to a direct current bus of the DC-DC converter.

When there is no short-circuit fault, currents of all photovoltaic units are aggregated into the direct current bus, and an absolute value of a current of the direct current bus (an absolute value of a detection current of a detection point A or a detection point B) is greater than an absolute value of a current of any branch.

When a short-circuit fault occurs on one photovoltaic unit, an output current of another normal photovoltaic unit flows to a branch in which the short-circuited photovoltaic unit is located. As a result, an overcurrent and a reverse current occur on the faulty branch.

In this case, a release device on the faulty branch controls a corresponding switching device to be disconnected, so that the faulty branch is disconnected, and another photovoltaic unit can continue to work normally.

Figure 17:
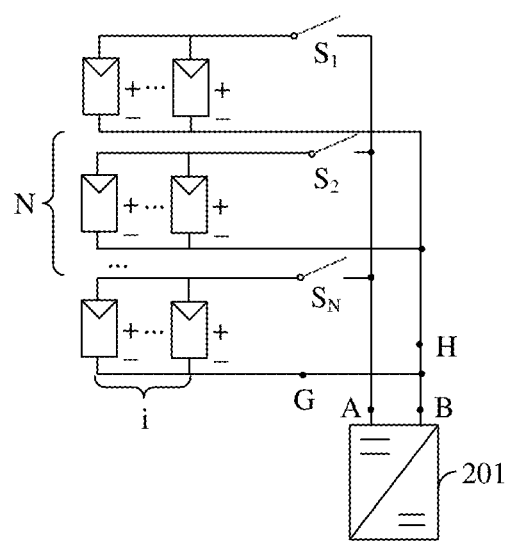
FIG. 17 is a schematic diagram of still another photovoltaic power generation system according to an embodiment.

FIG. 17 is a schematic diagram of still another photovoltaic power generation system according to an embodiment.

Every i photovoltaic units are directly connected in parallel inside a DC-DC converter. Subsequently, the i photovoltaic units are connected in series to at least one protection switch and then are connected to a direct current bus of the DC-DC converter. N is an integer greater than or equal to 2.

When a short-circuit fault occurs in a single photovoltaic unit, when the faulty photovoltaic unit can tolerate an output current of one other normal photovoltaic unit, a value of i is 2; or when the faulty photovoltaic unit can tolerate output currents of two other normal photovoltaic units, a value of i is 2 or 3.

Figure 18:
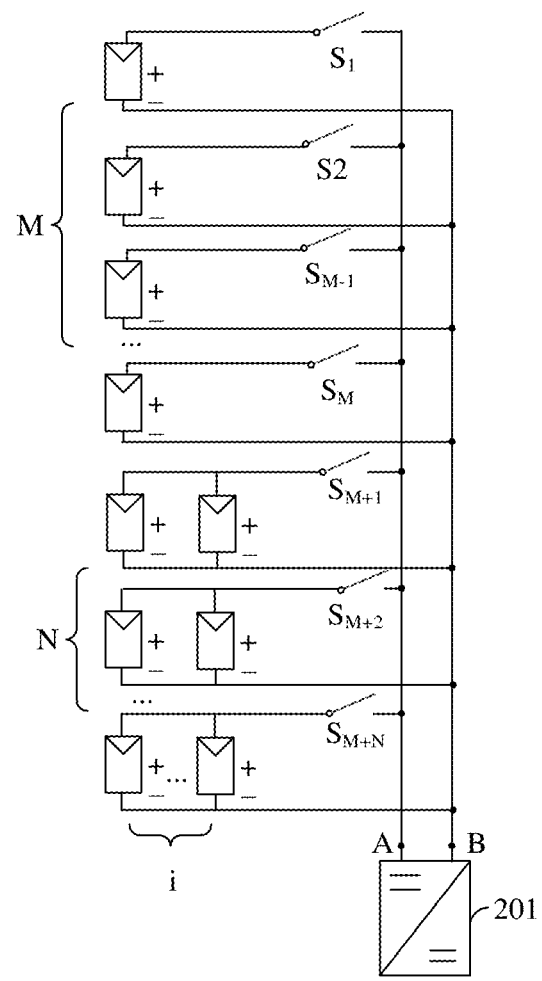
FIG. 18 is a schematic diagram of yet another photovoltaic power generation system according to an embodiment.

FIG. 18 is a schematic diagram of yet another photovoltaic power generation system according to an embodiment.

M photovoltaic units are each connected in series to at least one switch inside a DC-DC converter, and then are connected to a direct current bus.

i photovoltaic units are directly connected in parallel inside the DC-DC converter. Subsequently, the i photovoltaic units are connected in series to at least one protection switch and then are connected to the direct current bus of the DC-DC converter. N is an integer greater than or equal to 2.

When a short-circuit fault occurs in a single photovoltaic unit, when the faulty photovoltaic unit can tolerate an output current of one other normal photovoltaic unit, a value of i is 2; or when the faulty photovoltaic unit can tolerate output currents of two other normal photovoltaic units, a value of i is 2 or 3.

Figure 19:
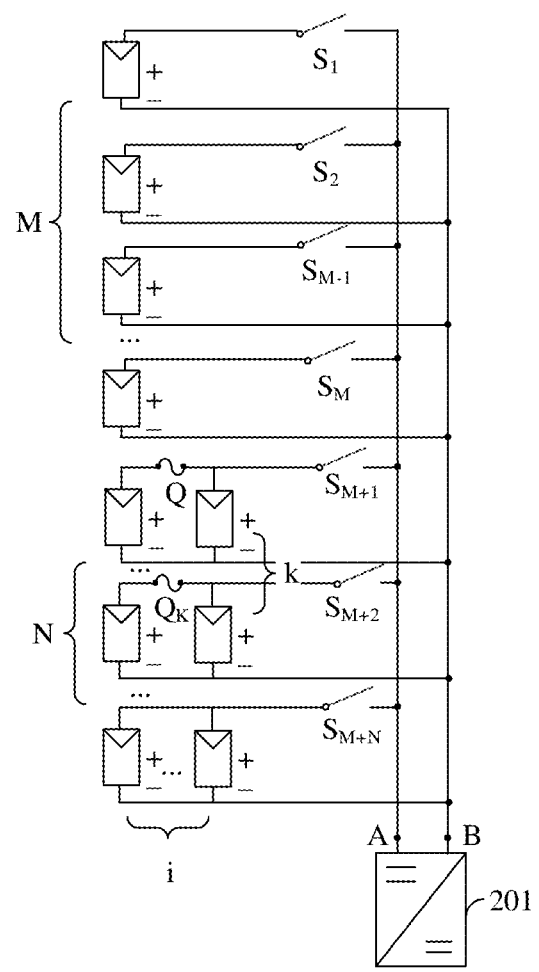
FIG. 19 is a schematic diagram of another photovoltaic power generation system according to an embodiment.

Further, FIG. 19 is a schematic diagram of another photovoltaic power generation system according to an embodiment.

A photovoltaic unit and a protective device can be connected in series or in parallel, and then be connected to a DC-DC converter. The figure is illustrated by using an example in which every two of i photovoltaic units are connected in parallel by using a protective device in between. In some embodiments, the protective device may alternatively be connected in series to a photovoltaic unit.

A protective device Q may be one or a combination of a fuse, an optimizer, and a disconnection box, or may be another component that can protect a circuit when a short-circuit fault occurs in the circuit. This is not limited in this embodiment.

A value of k in the figure may be determined based on an actual case. This is not limited in this embodiment.

In this case, a release device is further configured to prevent the protective device from triggering a protection action when controlling a switching device to be disconnected. In other words, when the current photovoltaic power generation system that uses the protective device is reconstructed, the protective device may not need to be removed, and may be directly connected to the DC-DC converter.

It should be noted that, when a short-circuit fault occurs on a single photovoltaic unit, and the faulty photovoltaic unit can tolerate an output current of one another normal photovoltaic unit, to avoid triggering the protection action of the protective device, a value of i is 2. When the faulty photovoltaic unit can tolerate output currents of two other normal photovoltaic units, to avoid triggering the protection action of the protective device, the value of i is 2 or 3.

Figure 20:
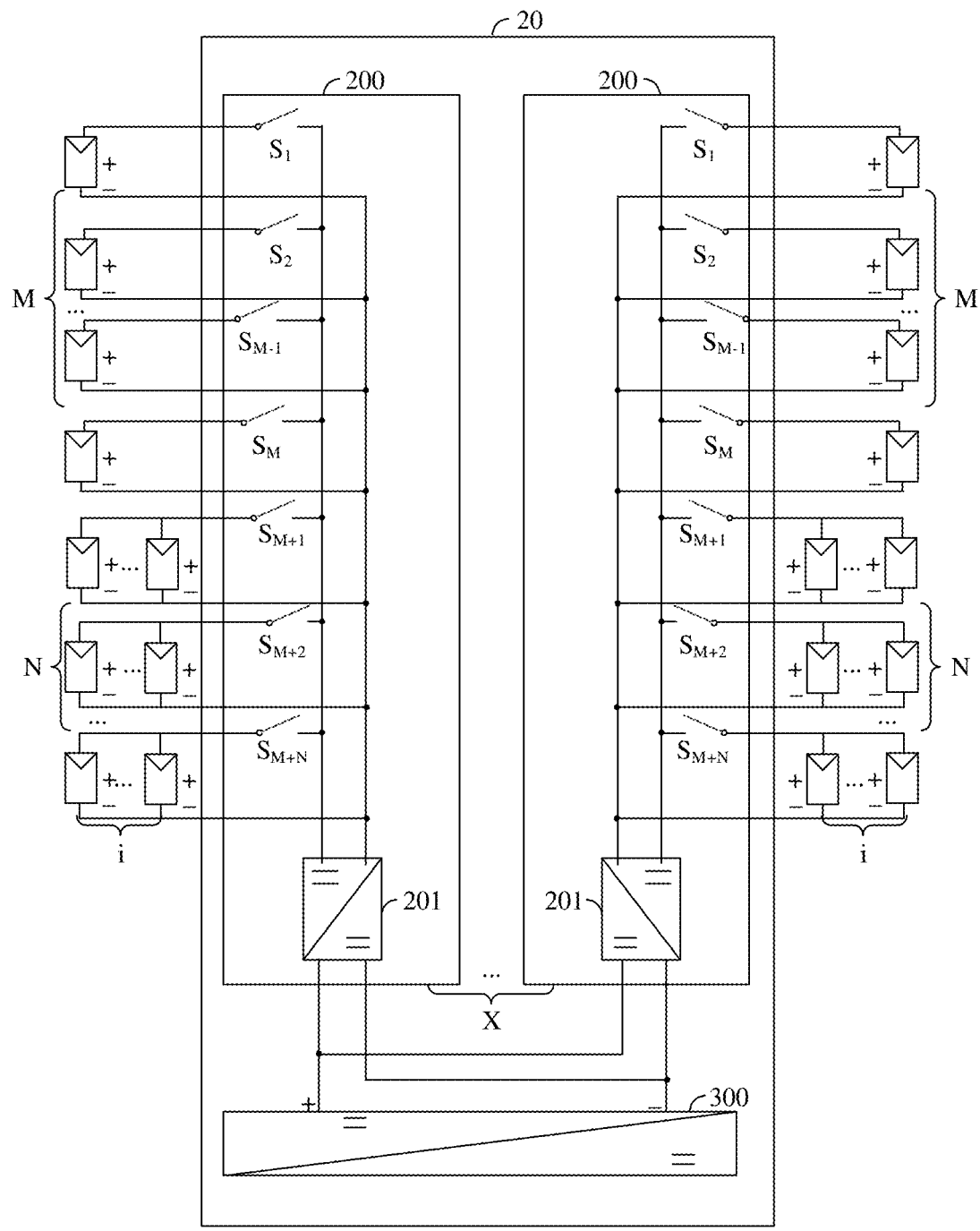
FIG. 20 is a schematic diagram of still another photovoltaic power generation system according to an embodiment.

FIG. 20 is a schematic diagram of still another photovoltaic power generation system according to an embodiment.

The photovoltaic power generation system shown in the figure includes X DC-DC converters 200, and further includes a DC-AC converter 300. The DC-AC converter may also be referred to as an inverter.

The DC-AC converter and the plurality of DC-DC converters form an inverter 20, which is a string inverter.

Positive output ports of the X DC-DC converters 200 are connected in parallel to a positive input port of the DC-AC converter 300, and negative output ports of the X DC-DC converters 200 are connected in parallel to a negative input port of the DC-AC converter 300.

An alternating current output by the inverter 20 is aggregated after flowing through an alternating current combiner box or a switch box, and then reaches an alternating current power grid after being transformed by a transformer.

Figure 21:
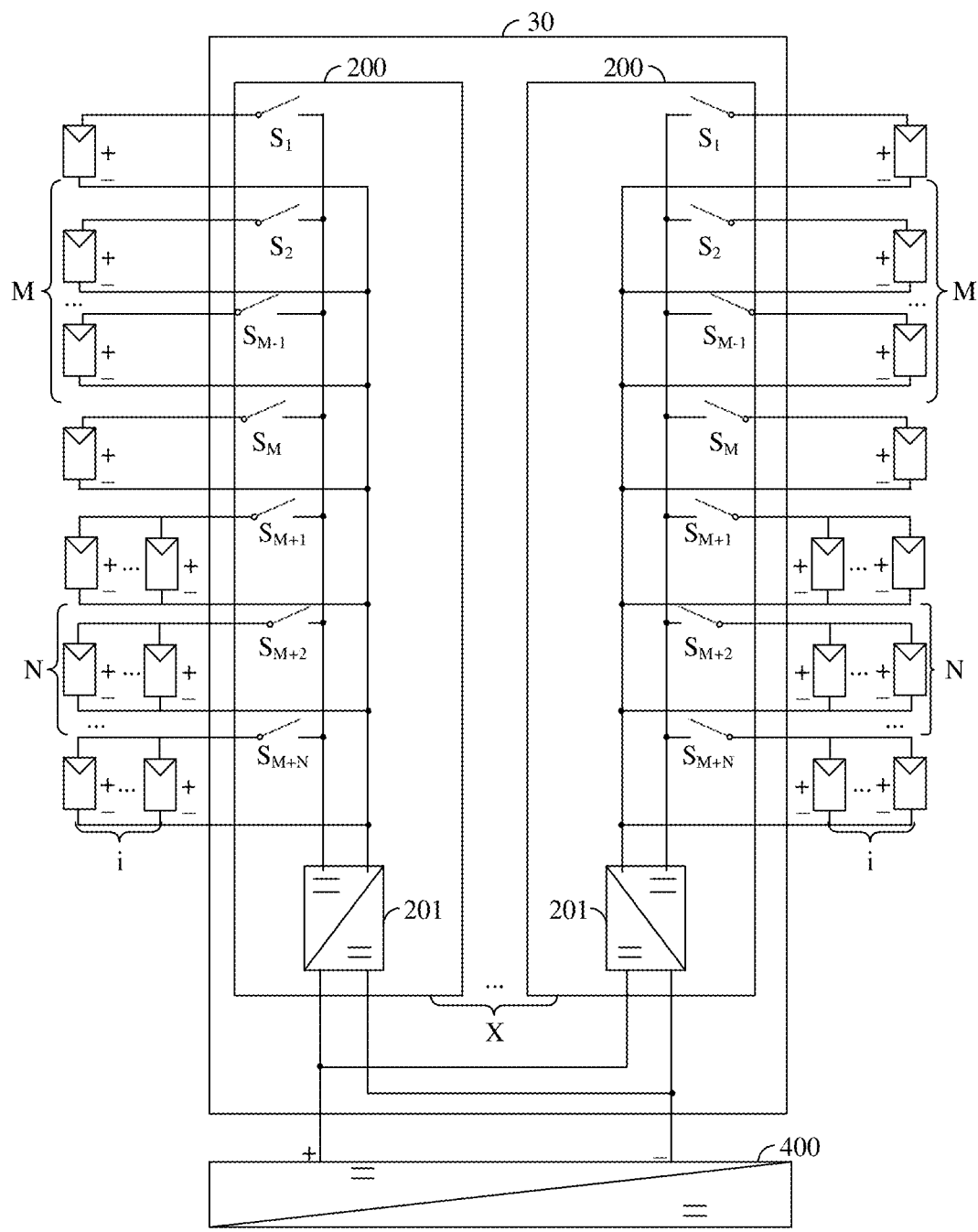
FIG. 21 is a schematic diagram of yet another photovoltaic power generation system according to an embodiment.

FIG. 21 is a schematic diagram of yet another photovoltaic power generation system according to an embodiment.

X DC-DC converters 200 included in the photovoltaic power generation system shown in the figure form a direct current combiner box 30. Positive output ports of the X DC-DC converters 200 are connected in parallel to form a positive output port of the direct current combiner box 30. Negative output ports of the X DC-DC converters 200 are connected in parallel to form a negative output port of the direct current combiner box 30.

In some embodiments, the direct current combiner box 30 is an MPPT boost combiner box, and the positive output end and the negative output end of the direct current combiner box 30 are respectively connected to a positive input end and a negative input end of a centralized inverter.

The centralized inverter is configured to convert, into an alternating current output, a single direct-current input from a direct current side or a plurality of direct-current inputs that are from the direct current side and that are connected in parallel. In some embodiments, DC-AC single-stage power conversion is used. The alternating current output by the centralized inverter flows through a transformer and then are aggregated into an alternating current power grid.

Based on the photovoltaic power generation systems provided in the foregoing embodiments, an embodiment further provides a photovoltaic inverter, which is described below with reference to the accompanying drawings.

Figure 22:
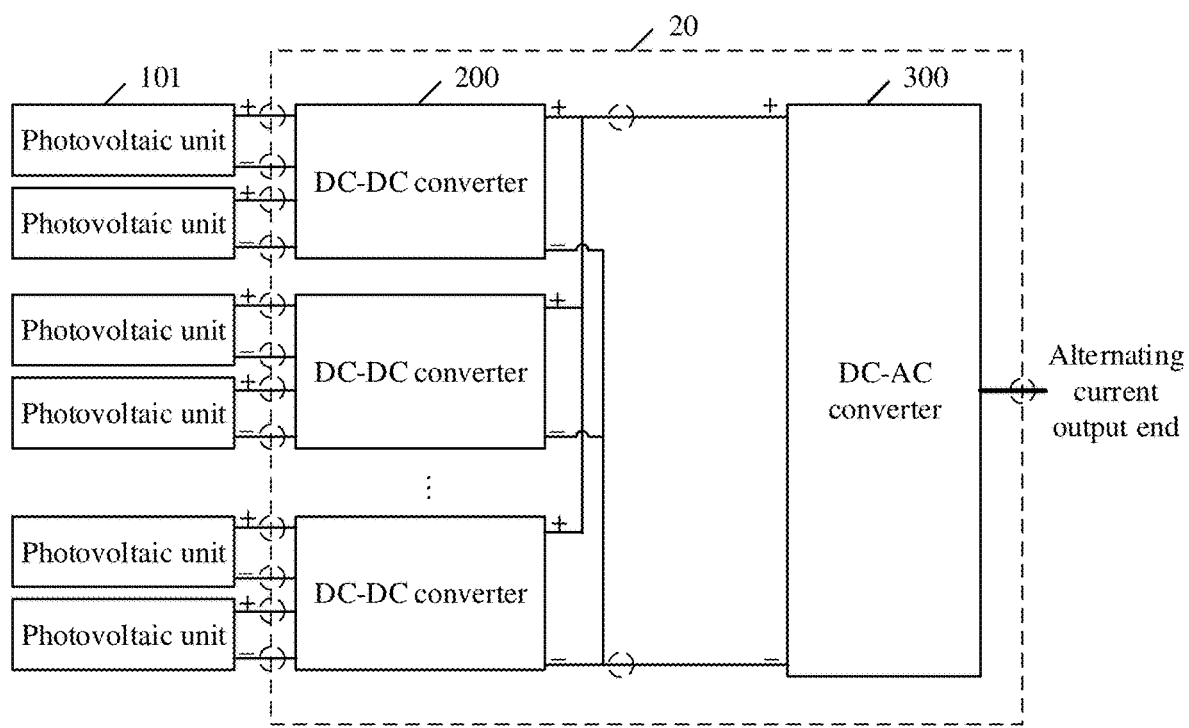
FIG. 22 is a schematic diagram of a photovoltaic inverter according to an embodiment.

FIG. 22 is a schematic diagram of a photovoltaic inverter according to an embodiment.

The photovoltaic inverter 20 shown in the figure includes a protection switch (not shown in the figure), a DC-AC converter 300, and a plurality of DC-DC converters 200.

An input end of each DC-DC converter 200 is connected to at least two photovoltaic units 101, and each photovoltaic unit includes at least one photovoltaic module.

Each DC-DC converter 200 includes a direct current bus, a DC-DC circuit, and at least one input interface.

Each input interface includes a positive input interface and a negative input interface.

The input interface is configured to connect to the photovoltaic units. The positive input interface is connected to a positive direct current bus inside the photovoltaic inverter 20, and the negative input interface is connected to a negative direct current bus inside the photovoltaic inverter.

Positive output ports of the plurality of DC-DC converters 200 are connected in parallel to a positive input port of the DC-AC converter 300, and negative output ports of the plurality of DC-DC converters 200 are connected in parallel to a negative input port of the DC-AC converter 300.

The protection switch includes a release device and a switching device. The release device is configured to: when a short-circuit fault occurs on a line in which the release device is located, control the switching device to be disconnected.

In a possible implementation, the release device is an electromagnetic release device. When a reverse current on the branch in which the release device is located is greater than a first current value, the release device controls the switching device to be disconnected.

In another possible implementation, the release device is an electromagnetic release device. When an overcurrent occurs on the branch in which the release device is located, the release device controls the switching device to be disconnected.

In still another possible implementation, the release device is a thermal release device. When an overcurrent occurs on the branch in which the release device is located, the release device controls the switching device to be disconnected.

According to the photovoltaic inverter, when a short-circuit fault occurs on a photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for a built-in fuse may be disposed on a photovoltaic unit side instead of being disposed below the photovoltaic inverter of the photovoltaic power generation system. Therefore, cable costs are further reduced.

Based on the photovoltaic power generation systems provided in the foregoing embodiments, an embodiment further provides a direct current combiner box, which is described below with reference to the accompanying drawings.

Figure 23:
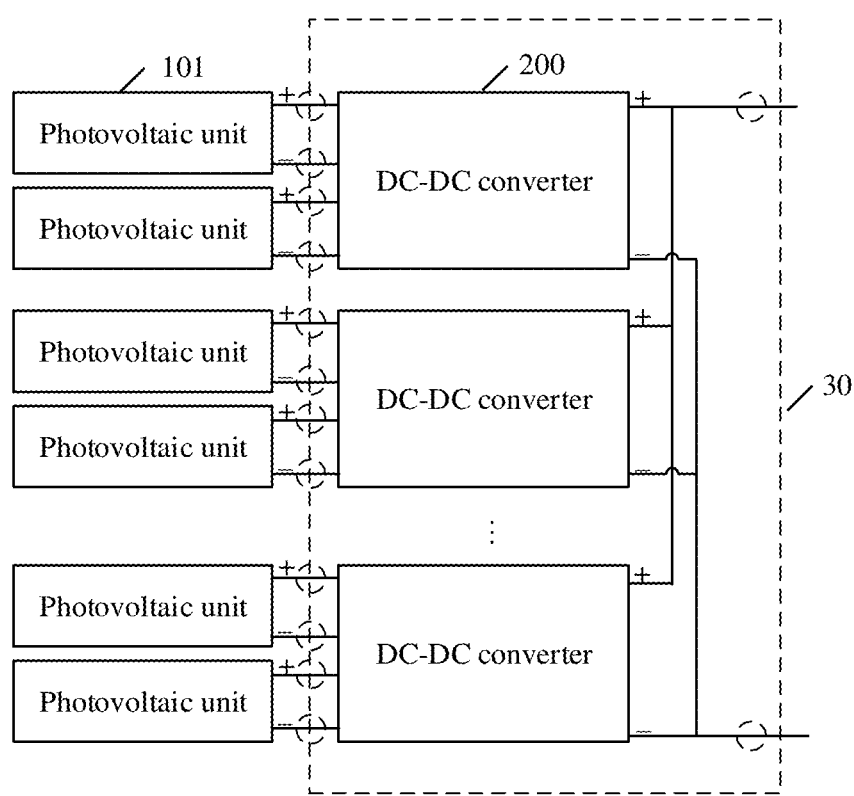
FIG. 23 is a schematic diagram of a direct current combiner box according to an embodiment.

FIG. 23 is a schematic diagram of a direct current combiner box according to an embodiment.

The direct current combiner box 30 includes a protection switch (not shown in the figure) and a plurality of DC-DC converters 200.

An input end of each DC-DC converter is connected to at least two photovoltaic units 101, and each photovoltaic unit includes at least one photovoltaic module.

Each DC-DC converter includes a direct current bus, a DC-DC circuit, and at least one input interface. The input interface includes a positive input interface and a negative input interface. The input interface is configured to connect to the photovoltaic units. The positive input interface is connected to a positive direct current bus inside the direct current combiner box 30, and the negative input interface is connected to a negative direct current bus inside the direct current combiner box 30.

Positive output ports of the plurality of DC-DC converters 200 are connected in parallel to form a positive output port of the direct current combiner box 30, and negative output ports of the plurality of DC-DC converters 200 are connected in parallel to form a negative output port of the direct current combiner box 30.

The protection switch includes a release device and a switching device. The release device is configured to: when a short-circuit fault occurs on a line in which the release device is located, control the switching device to be disconnected.

In a possible implementation, the release device is an electromagnetic release device. When a reverse current on the branch in which the release device is located is greater than a first current value, the release device controls the switching device to be disconnected.

In another possible implementation, the release device is an electromagnetic release device. When an overcurrent occurs on the branch in which the release device is located, the release device controls the switching device to be disconnected.

In still another possible implementation, the release device is a thermal release device. When an overcurrent occurs on the branch in which the release device is located, the release device controls the switching device to be disconnected.

In some embodiments, at least one of the positive input interface or the negative input interface of each input interface is connected in series to the protection switch inside the direct current combiner box 30.

According to the direct current combiner box, when a short-circuit fault occurs on a photovoltaic unit, the release device controls the switching device to be disconnected, so that the interface is disconnected from the direct current bus, and the photovoltaic unit connected to the interface is disconnected from the direct current bus. Therefore, a photovoltaic unit connected to another interface does not output a current to a line in which the photovoltaic unit with the short-circuit fault is located, thereby protecting the photovoltaic unit and the line from damage. Based on a protection action triggered by the switching device under control by the release device, no additional control circuit is required, and implementation difficulty of the solution is reduced. In addition, because a fuse is no longer used, a Y wire harness originally used for a built-in fuse may be disposed on a photovoltaic unit side instead of being disposed below the direct current combiner box of the photovoltaic power generation system. Therefore, cable costs are further reduced.

"At least one" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including any combination of singular items (pieces) or plural items (pieces). For example, at least one item (piece) of a, b, or c may represent: a, b, c, "a and b", "a and c", "b and c", or "a, b, and c", where a, b, and c may be singular or plural.

The foregoing embodiments are merely intended to describe the solutions, but are not limiting. Although described in detail with reference to the foregoing embodiments, a person of ordinary skill in the art may still make modifications to the solutions described in the foregoing embodiments or make equivalent replacements to some features thereof, without departing from the scope of the embodiments.

What is claimed is:

1. A photovoltaic power generation system, comprising:
a protection switch; and
a plurality of DC-DC converters, wherein each DC-DC converter of the plurality of DC-DC converters comprises:
a direct current bus,
a DC-DC circuit, and
a plurality of input interfaces configured to connect to a plurality of photovoltaic units each comprising at least one photovoltaic module and connect to the direct current bus via a plurality of protection switches, the direct current bus is configured to connect to an input end of the DC-DC circuit, and output ends of the DC-DC circuits of the plurality of DC-DC converters are connected in series, wherein the input interfaces comprising at least two interface groups each group comprising at least one interface and is connected to a maximum of three photovoltaic units are connected in parallel;
wherein the protection switches are triggered due to a short-circuit fault that occurs on a line in which the protection switches are located, to disconnect the protection switches so as to protect the photovoltaic units, the line, or the photovoltaic power generation system.

2. The photovoltaic power generation system according to claim 1, wherein the protection switch comprises a release device and a switching device, the short-circuit fault comprises either a reverse current, on the line in which the release device is located, that is greater than a first current value or an overcurrent that occurs on the line in which the protection switch is located, and the release device is configured to control the switching device to be disconnected when the short-circuit fault occurs.

3. The photovoltaic power generation system according to claim 1, wherein two interface of the at least two interface groups connected to different numbers of photovoltaic modules.

4. The photovoltaic power generation system according to claim 1, wherein a number of photovoltaic units connected to one of a first interface group of the at least two interface groups is more than a number of photovoltaic units connected to one of a second interface group of the at least two interface groups.

5. The photovoltaic power generation system according to claim 4, wherein each interface is connected to positive or negative output ends of one or more photovoltaic units, a number of the positive or negative output end/ends of the photovoltaic units connected to one of the first interface group is more than a number of the positive or negative output end/ends of the photovoltaic units connected to one of the second interface group.

6. The photovoltaic power generation system according to claim 1, wherein positive or negative output ends of the photovoltaic units are connected to the direct current bus via N of the protection switches, the other opposite polarity output ends of the at least three or four photovoltaic units are connected to the direct current bus via more than the N of the protection switches, the N representing at least one rotary direct current switch disconnector.

7. The photovoltaic power generation system according to claim 1, wherein, when the protection switches are turned on and connected to the direct current bus, the photovoltaic units connected to the same are DC-DC converter are in parallel connection to each other; and
when the protection switches are turned off and disconnect the photovoltaic units from the direct current bus of the same are DC-DC converter, the photovoltaic units connected to the same are DC-DC converter are reduced into only two photovoltaic units to be directly connected in parallel.

8. The photovoltaic power generation system according to claim 1, further comprising: a DC-AC converter, the DC-AC converter and the plurality of DC-DC converters form an inverter, positive output ports of the plurality of DC-DC converters are connected in parallel to a positive input port of the DC-AC converter, and negative output ports of the plurality of DC-DC converters are connected in parallel to a negative input port of the DC-AC converter.

9. The photovoltaic power generation system according to claim 1, wherein the protection switches are configured disconnect all or some of the photovoltaic units from the direct current bus, to reduce a number of the photovoltaic units in parallel connection to each other so that only two photovoltaic units directly connected in parallel are presence when a reverse current value of a branch or a parameter detection value of the direct current bus is greater than a first current value.

10. The photovoltaic power generation system according to claim 1, wherein the at least two interface groups comprising a first interface group and a second interface group comprising at least one interface, the number of photovoltaic units connected to one of the second interface group is more than the number of photovoltaic units connected to one of a first interface group, each of the interfaces is connected to positive output end or negative output end of at least one photovoltaic unit, so that two of the protection switches are carrying different current.

11. The photovoltaic power generation system according to claim 1, wherein the plurality of photovoltaic units are coupled to the direct current bus to form at least two branches, and each branch having at least one photovoltaic unit; the number of the protection switches connected to positive or negative output ends of the photovoltaic units from the branches is more than the number of the protection switches connected to the opposite polarity output ends of the photovoltaic units from the branches.

12. A photovoltaic inverter, configured to connect to a photovoltaic unit, wherein the photovoltaic unit comprises at least one photovoltaic module, and the photovoltaic inverter comprises:
   a plurality of protection switches;
   a DC-AC converter; and
   a plurality of DC-DC converters, wherein each DC-DC converter of the plurality of DC-DC converters comprises:
      a direct current bus, a plurality of photovoltaic units are coupled to the direct current bus via to form at least two branches,
      a DC-DC circuit, and
         a plurality of interfaces configured to be connected to the photovoltaic units via g the protection switches, the direct current bus is configured to connect to an input end of the DC-DC circuit, and output ends of the DC-DC circuits of the plurality of DC-DC converters are connected in series, positive ports of the output ends of the plurality of the DC-DC converters are connected in parallel to a positive input port of the DC-AC converter, negative ports of the output ends of the plurality of the DC-DC converters are connected in parallel to a negative input port of the DC-AC converter,
      wherein the protection switches are triggered due to a short-circuit fault that occurs on a line in which the protection switches are located, to disconnect the switching device so as to protect the photovoltaic unit, the line, or a power generation system; and
      wherein at least one of the branches have at least two photovoltaic units which connected to the direct current bus via the protection switches.

13. The photovoltaic inverter according to claim 12, wherein the input interfaces comprising a first interface group and a second interface group, each interface is only connected to one output end of at least one photovoltaic units; and
   a number of the photovoltaic units connected to one of the first interface group is more than a number of the photovoltaic units connected to one of the second interface group.

14. The photovoltaic inverter according to claim 12, wherein at least four photovoltaic units of the photovoltaic units are connected to the input interfaces, wherein each photovoltaic unit comprises at least one photovoltaic string, wherein positive or negative output ends of the at least four photovoltaic units are aggregated and then are all connected to a single protection switch, and each one or two of the respective opposite output ends of the at least four photovoltaic units is connected to a respective protection switch.

15. The photovoltaic inverter according to claim 12, wherein three of the photovoltaic units are connected to the input interfaces, wherein each photovoltaic unit comprises at least one photovoltaic string, wherein positive or negative output ends of the three photovoltaic units are aggregated and then all connected to a single protection switch, and the respective opposite output ends of two of the at three photovoltaic units is connected to one of two protection switches, and the respective opposite output end of the other one of the three photovoltaic units is connected to another one of the two protection switches.

16. The method according to claim 12, wherein four of the photovoltaic units are connected to the interfaces, wherein each photovoltaic unit comprises at least one photovoltaic string, wherein positive or negative output ends of two of the four photovoltaic units are aggregated and then connected to a same protection switch, and wherein positive or negative output ends of the other two of the four photovoltaic units are aggregated and then connected to a same other protection switch, and two of the respective opposite output ends of the four photovoltaic units are connected to the same protection switch and each one of the other two opposite output ends is connected to a respective protection switch.

17. The method according to claim 12, wherein four of the photovoltaic units are connected to the input interfaces, wherein each photovoltaic unit comprises at least one photovoltaic string, wherein positive or negative output ends of three of the four photovoltaic units are aggregated and then connected to a same protection switch, and wherein a positive or negative output end of the other one of the four photovoltaic units is connected to another protection switch, and three of the respective opposite output ends of the four photovoltaic units are connected to the same protection switch and the other one opposite output end is connected to a respective protection switch.

18. The method according to claim 12, wherein the photovoltaic units comprise a first photovoltaic group and a second photovoltaic group, the first photovoltaic group comprising at least one photovoltaic unit and the second photovoltaic group comprising at least two photovoltaic units which are directly connected in parallel, a positive or negative output end of each photovoltaic unit of the first photovoltaic group is connected to the direct current bus via respective one of the protection switches, positive or negative output ends of the every two photovoltaic units of the second photovoltaic group are both connected in series to another single one of the protection switches which connected to the direct current bus.

19. The method according to claim 12, wherein the short-circuit fault occurs when a reverse current on the line in which the protection switches is located is greater than a first current value.

20. A protection control method for a power converter which configured to connect to a photovoltaic unit with at least one photovoltaic module, the power converter comprises a protection switch and a plurality of DC-DC converters, each DC-DC converter of the plurality of DC-DC converters comprises a direct current bus, a DC-DC circuit, and at least one input interface configured to connect to the photovoltaic unit and connect to the direct current bus by using the protection switch, the direct current bus is configured to connect to an input end of the DC-DC circuit, and an output end of the DC-DC circuit is an output end of the DC-DC converter, positive ports of the output ends of the plurality of DC-DC converters are connected in parallel to a positive output port of the power converter, negative ports of the output ends of the plurality of DC-DC converters are connected in parallel to a negative output port of the power converter, the protection switch comprises a release device and a switching device that are connected in series; and the method comprises:

releasing a holding mechanism when a protection action is triggered due to a short-circuit fault that occurs on a line in which the release device is located, to disconnect the switching device so as to protect the photovoltaic unit, the line or the power converter.

* * * * *